Jan. 31, 1967   D. J. BARR   3,300,835
RESILIENT WHEELS
Filed Aug. 18, 1964

INVENTOR
DAVID JOHN BARR
BY
Hall & Houghton
ATTORNEY

United States Patent Office 3,300,835
Patented Jan. 31, 1967

3,300,835
RESILIENT WHEELS
David John Barr, Harrow Weald, England, assignor to Her Majesty's Postmaster General, London, England
Filed Aug. 18, 1964, Ser. No. 390,364
Claims priority, application Great Britain, Sept. 3, 1963, 34,782/63
8 Claims. (Cl. 29—121)

This invention relates to resilient wheels and has particular although not exclusive reference to resilient wheels for use in mail handling machinery.

To be suitable for use in mail handling machinery, resilient wheels must be capable of considerable distortion if they are to accommodate satisfactorily postal articles of a wide range of thicknesses. Further, if the wheels are required to proper articles through the machinery, they must retain adequate driving contact with the articles. Earlier forms of resilient wheels have not proved entirely satisfactory and at present it is common practice to employ substantially non-resilient wheels on axles which are resiliently mounted, e.g. on a spring mounting.

According to the present invention a wheel comprises a peripheral portion, a hub portion, and, interconnecting the peripheral portion and the hub portion, a web of a material selected from the group consisting of natural rubber, synthetic rubber and plastics material and consisting of multiple hollow frusto-conical sections, alternate sections being inverted.

The word "wheel" as used herein includes not only true wheels, i.e. those whose circumference is circular, but also wheels whose circumference is only substantially circular, for example D-shaped wheels.

Preferably, the wheel is a one-piece moulding of natural or synthetic rubber or of a plastics material for example a suitable polyurethane. A particularly suitable material is that known under the Registered Trademark "Adiprene."

Advantageously, the web increases in thickness regularly or in steps from its junction with the hub portion to its junction with the peripheral portion, and the peripheral portion is thicker than the limbs. The rate of increase in thickness is such as to promote uniform collapsing of the web from the peripheral portion to the hub portion. The action is generally similar to that of a "concertina."

Figure 1:
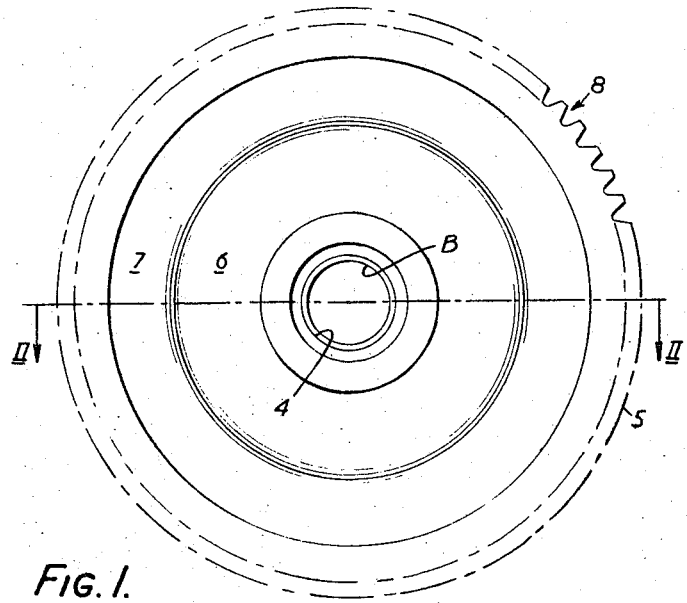
Figure 2:
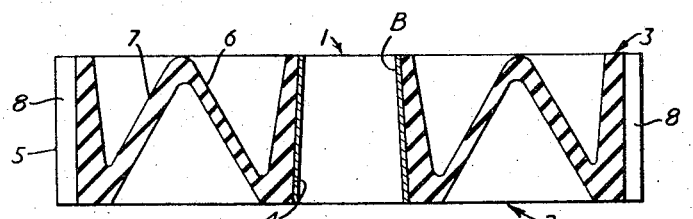
Figure 3:
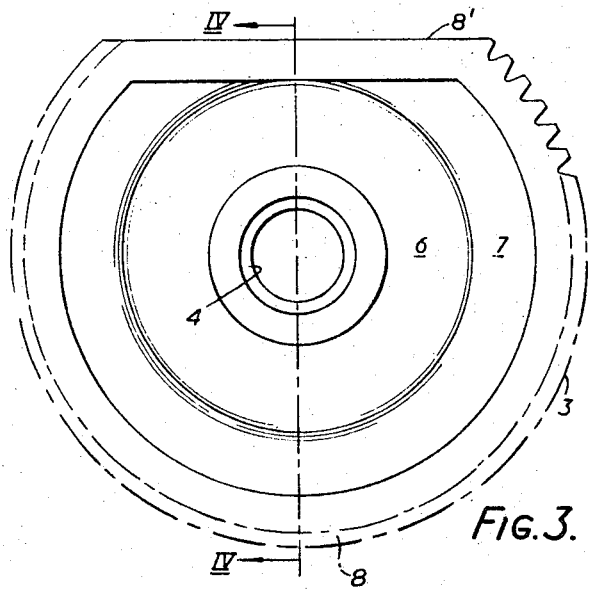
Figure 4:
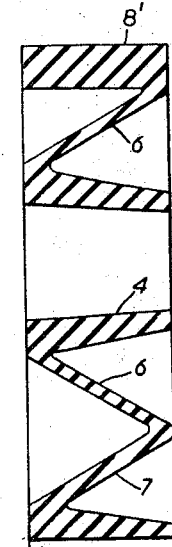

By way of example only, two embodiments of the invention will now be described in greater detail with reference to the accompanying drawings of which:

FIG. 1 is an elevation of the first embodiment,
FIG. 2 is a section on line II—II of FIG. 1,
FIG. 3 is an elevation of the second embodiment, and
FIG. 4 is a section on the line IV—IV of FIG. 3 of the drawings.

The wheel shown in FIGS. 1 and 2 is a one-piece moulding of the plastics material known as "neoprene" having a Shore hardness A 60±5.

The wheel has a hub portion 1, a peripheral portion 3 and a web 2 interconnecting portions 1 and 3. The hub has a central bore 4 and the peripheral portion has an edge 5 of relatively substantial width as shown. The web 2 comprises two hollow frusto-conical sections 6, 7 joined together as shown with section 7 inverted with respect to section 6. As shown in FIG. 2, the sections 6 and 7 are sections of cones having acute apex angles, e.g. about 60° angles in the form shown. Thus in the form shown, the surfaces 6 and 7 lie at angles of about 30° to the axes of the cones, and at about 60° to each other on the diametrical plane of the wheel. The acute angle junction between the frusto-conical sections thus forms a fold giving the web a "concertina" configuration. Section 7 has a greater wall thickness than section 6 and in addition, the thickness of the wall of the bore 4 increases towards the junction with section 6 while that of the edge 5 decreases from the junction with section 7. The edge 5 is serrated or milled as indicated at 8 in FIG. 1.

The wheel shown in FIGS. 1 and 2 can be driven by mounting it on a driving axle whose diameter is slightly greater than the internal diameter of the bore 4 or the wheel can be free running by inserting a metal bush B in the bore as shown in FIGS. 1 and 2 and then mounting upon an axle of suitable diameter. A thin-walled bush coated with polytetrafluorethylene is to be preferred.

The wheel shown in FIGS. 3 and 4 is generally similar to that shown in FIGS. 1 and 2 except that the peripheral portion 3 is D shaped and not circular when seen in elevation as in FIG. 3. The flat 8' is formed during moulding and it will be observed from FIG. 4 that at the centre of the flat 8' the web has only a single frusto-conical section formed by the section 6.

The wheel shown in FIGS. 3 and 4 can be mounted in a manner similar to that described above with reference to the wheel shown in FIGS. 1 and 2.

It will be understood that wheels of the form described above distort easily by collapsing towards the hub portion and closing up the sections of the web portion 2. The change in thickness described above tends to ensure uniform collapsing so that the life of the wheels is prolonged by reason of the small deflections at each of the junctions and the edge 5 tends to remain in contact with the surface of the articles being handled. Thus the wheels are very suitable for use in mail handling machinery where postal packets whose thicknesses vary over a comparatively wide range have to be dealt with. It will be seen that a pair of wheels mounted on parallel axes at a fixed distance apart which is slightly less than the diameter of a wheel will rotate with their edges 5 in contact and can handle thin flimsy airmail letters as well as letters containing bulky objects. The sections 6 and 7 permit distortion to accommodate the greater thicknesses of bulky objects while maintaining the edges 5 in substantial contact with the surfaces of the objects.

The wheel shown in FIGS. 3 and 4 is used in postal machinery employing stop-start mechanisms particularly those where letters are turned through an angle.

In addition to forming driving or free running wheels as described above, the wheels can also be used as mountings for rollers by simply inserting a wheel in each end of a tube and mounting the wheels as described above. Naturally, the wheels shown in FIGS. 1 and 2 will normally be used for such an application.

The small mass of the wheels assists considerably in the design of postal machinery having non-linear velocities for example synchronizing gates, besides reducing the weight of a machine which may employ a very large number of wheels.

It will be understood that a construction having three or more hollow frusto-conical sections could be used, adjacent sections being inverted.

I claim:
1. A wheel comprising in combination a peripheral portion, a hub portion, and, interconnecting the peripheral portion and the hub portion, a web of a material selected from the group consisting of natural rubber, synthetic rubber and plastic materials and consisting of multiple hollow frusto-conical sections having acute apex angles, alternate sections being inverted.

2. A wheel of a one-piece moulding of a material selected from the group consisting of natural rubber, synthetic rubber and plastics materials and comprising in combination a peripheral portion, a hub portion, and, interconnecting the peripheral portion and the hub portion, a web consisting of multiple hollow frusto-conical sections having acute apex angles, alternate sections being inverted.

3. A wheel comprising in combination a peripheral portion a part of which lies on the circumference of a circle and the remainder of which lies on a chord of said circle, a hub portion, and, interconnecting the peripheral portion and the hub portion, a resilient web consisting of multiple hollow frusto-conical sections, alternate sections being inverted.

4. A wheel comprising in combination a peripheral portion, a hub portion including a central bore and a wall surrounding said bore, the thickness of said wall increasing from one end of the bore to the other, and, interconnecting the peripheral portion and the hub portion, a web of a material selected from the group consisting of natural rubber, synthetic rubber and plastics material and consisting of multiple hollow frusto-conical sections having acute apex angles, alternate sections being inverted.

5. A wheel of a one-piece moulding of a material selected from the group consisting of natural rubber, synthetic rubber and plastics materials, the wheel comprising in combination, a peripheral portion, a hub portion, and, interconnecting said portions, a web consisting of a plurality of hollow frusto-conical sections, alternate ones of which are inverted and whose wall thickness increases from the junction between the web and the hub portion to the junction between the web and the peripheral portion.

6. A wheel comprising in combination a peripheral portion having an edge of relatively substantial width and of a thickness which increases from one end of said edge to other end, a hub portion, and connected to the latter and to the peripheral portion adjacent the maximum edge wall thickness end, a web of a material selected from the group consisting of natural rubber, synthetic rubber and plastics material and consisting of multiple hollow frusto-conical sections having acute apex angles, alternate sections being inverted.

7. A wheel comprising in combination a peripheral portion, a hub portion including a central bore, a rigid bush in said bore, and, interconnecting the peripheral portion and the hub portion, a resilient web consisting of multiple hollow frusto-conical sections having acute apex angles, alternate sections being inverted.

8. A wheel comprising in combination a peripheral portion, a hub portion, and, interconnecting the peripheral portion and the hub portion, a resilient web consisting of a plurality of hollow frusto-conical sections, alternate sections being inverted, and each section from the hub to the peripheral portion being of increasing thickness.

References Cited by the Examiner

UNITED STATES PATENTS

| | | | |
|---|---|---|---|
| 2,073,347 | 3/1937 | Leathers | 152—48 X |
| 2,207,290 | 7/1940 | Hale | 74—443 |
| 2,686,549 | 8/1954 | Henry | 152—7 |
| 2,866,222 | 12/1958 | Lord | 16—45 |
| 2,878,074 | 3/1959 | Cawl | 301—63 |

FOREIGN PATENTS 1,007,671    2/1952    France.

MILTON BUCHLER, *Primary Examiner.*

BENJAMIN HERSH, *Examiner.*

R. J. JOHNSON, *Assistant Examiner.*